(12) United States Patent
Suzuki

(10) Patent No.: US 10,086,920 B2
(45) Date of Patent: Oct. 2, 2018

(54) VESSEL PROPULSION DEVICE

(71) Applicant: YAMAHA HATSUDOKI KABUSHIKI KAISHA, Iwata-shi, Shizuoka (JP)

(72) Inventor: Takaaki Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/657,391

(22) Filed: Jul. 24, 2017

(65) Prior Publication Data
US 2018/0037309 A1 Feb. 8, 2018

(30) Foreign Application Priority Data
Aug. 3, 2016 (JP) .................. 2016-153163

(51) Int. Cl.
| F02D 29/06 | (2006.01) |
| H02P 9/04 | (2006.01) |
| B63H 23/24 | (2006.01) |
| F02D 41/02 | (2006.01) |
| H02J 7/04 | (2006.01) |
| B63H 21/20 | (2006.01) |
| B63H 21/21 | (2006.01) |

(52) U.S. Cl.
CPC ............. *B63H 23/24* (2013.01); *B63H 21/21* (2013.01); *F02D 29/06* (2013.01); *F02D 41/021* (2013.01); *F02D 41/0205* (2013.01); *B63H 21/20* (2013.01); *B63H 2021/216* (2013.01); *F02D 2200/503* (2013.01)

(58) Field of Classification Search
USPC ............. 290/40 C; 320/145; 378/101
See application file for complete search history.

(56) References Cited

U.S. PATENT DOCUMENTS

| 4,768,216 | A | * | 8/1988 | Harvey | H05G 1/265 363/17 |
| 4,797,907 | A | * | 1/1989 | Anderton | H05G 1/10 378/101 |
| RE35,025 | E | * | 8/1995 | Anderton | H05G 1/10 320/DIG. 10 |
| 5,685,802 | A | | 11/1997 | Kanno | |
| 5,841,201 | A | * | 11/1998 | Tabata | B60K 6/365 290/40 C |
| 7,528,579 | B2 | * | 5/2009 | Pacholok | H02J 7/022 320/130 |

(Continued)

FOREIGN PATENT DOCUMENTS

| JP | 2012-254691 A | 12/2012 |
| JP | 2012-254692 A | 12/2012 |

*Primary Examiner* — Pedro J Cuevas
(74) *Attorney, Agent, or Firm* — Keating and Bennett, LLP

(57) ABSTRACT

A vessel propulsion device transmits a drive force of an engine to a propulsive force generator. The vessel propulsion device includes a generator that is driven by the engine, a power shutoff detector that detects a power shutoff state in which the drive force of the engine is not transmitted to the propulsive force generator, and a controller configured or programmed to, when the power shutoff detector detects the power shutoff state, select one of a plurality of charging modes to charge a battery connected to the generator and control a target speed of the engine based on a selected one of the charging modes.

16 Claims, 7 Drawing Sheets

(56) References Cited

U.S. PATENT DOCUMENTS

| | | | | |
|---|---|---|---|---|
| 7,569,942 B2* | 8/2009 | Kamimura | ............... | H02P 9/105 |
| | | | | 290/40 C |
| 7,808,211 B2* | 10/2010 | Pacholok | ................ | H02J 7/022 |
| | | | | 320/140 |
| 8,283,896 B1* | 10/2012 | Goluszek | ................ | H02J 7/345 |
| | | | | 320/140 |
| 2005/0088144 A1* | 4/2005 | Pacholok | ................ | H02J 7/022 |
| | | | | 320/131 |
| 2008/0026653 A1 | 1/2008 | Ito et al. | | |
| 2009/0206796 A1* | 8/2009 | Pacholok | ................ | H02J 7/022 |
| | | | | 320/145 |
| 2012/0315809 A1 | 12/2012 | Kuriyagawa et al. | | |

* cited by examiner

FIG. 2

| IDLING LEVEL | MODE | TARGET SPEED (rpm) | GENERATED CURRENT (A) | FUEL FLOW RATE (L/min) | ELECTRICITY EFFICIENCY (A/L/min) |
|---|---|---|---|---|---|
| Lv3 | CHARGING MODE | 2000 | 21 | 2.8 | 7.5 |
| Lv2 | CHARGING MODE | 1500 | 20 | 2.2 | 9.1 |
| Lv1 | CHARGING MODE | 1000 | 18 | 1.6 | 11.3 |
| Lv0 | NORMAL MODE (CHARGING MODE) | 700 | 15 | 1.0 | 15.0 |
| Lv-1 | CHARGING MODE | 550 | — | — | — |

FIG. 3

| IDLING LEVEL | MODE | TARGET SPEED (rpm) | GENERATED CURRENT (A) | FUEL FLOW RATE (L/min) | ELECTRICITY EFFICIENCY (A/L/min) |
|---|---|---|---|---|---|
| Lv3 | CHARGING MODE | 2000 | 21 | 1.4 | 15.0 |
| Lv2 | CHARGING MODE | 1500 | 20 | 1.1 | 18.2 |
| Lv1 | CHARGING MODE | 1000 | 18 | 0.8 | 22.5 |
| Lv0 | NORMAL MODE (CHARGING MODE) | 700 | 15 | 0.5 | 30.0 |
| Lv-1 | CHARGING MODE | 550 | — | — | — |

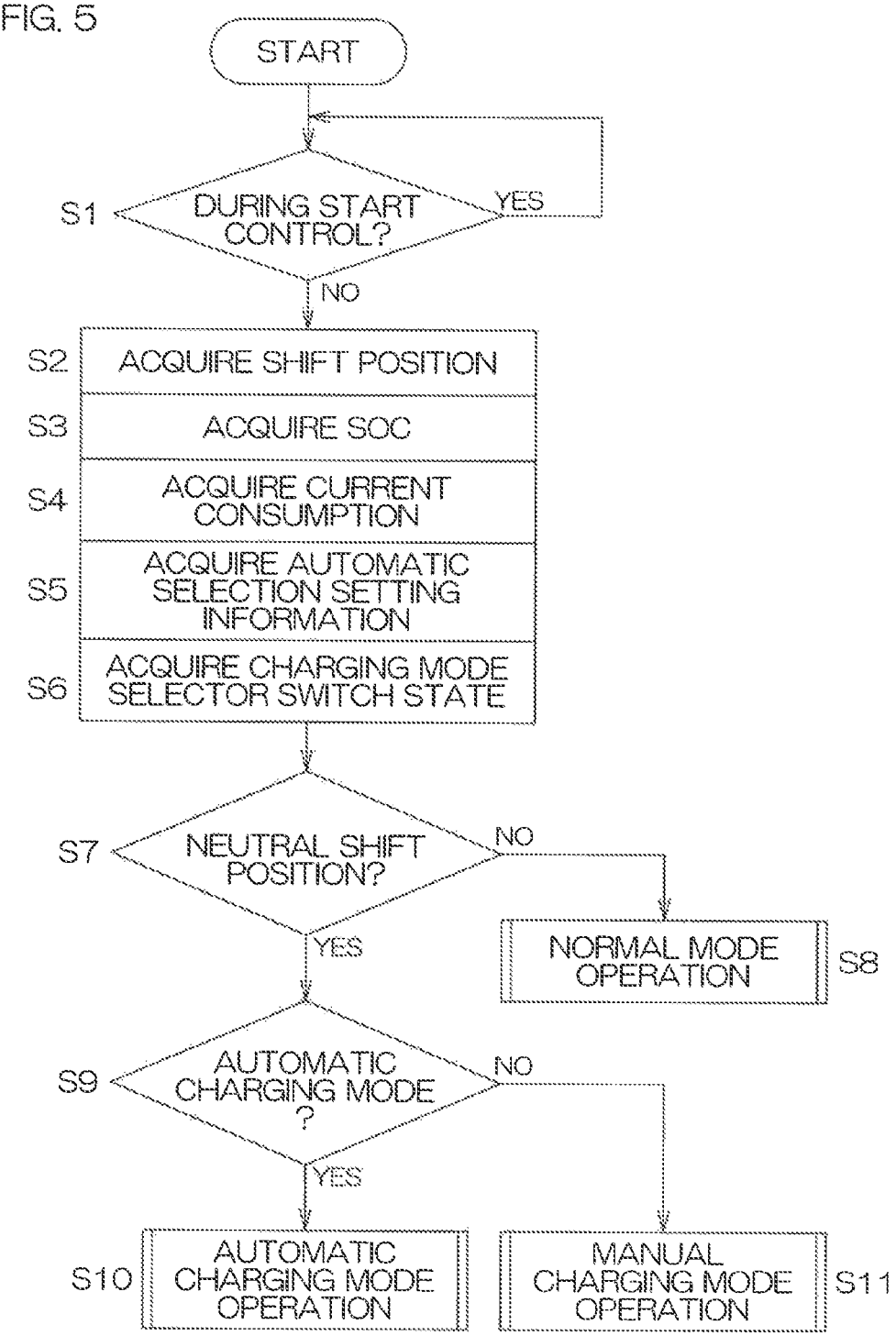

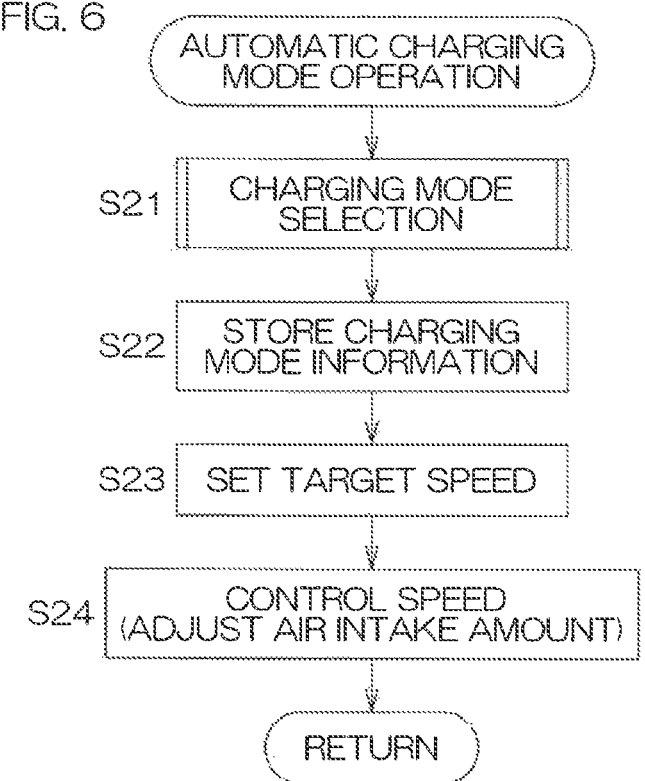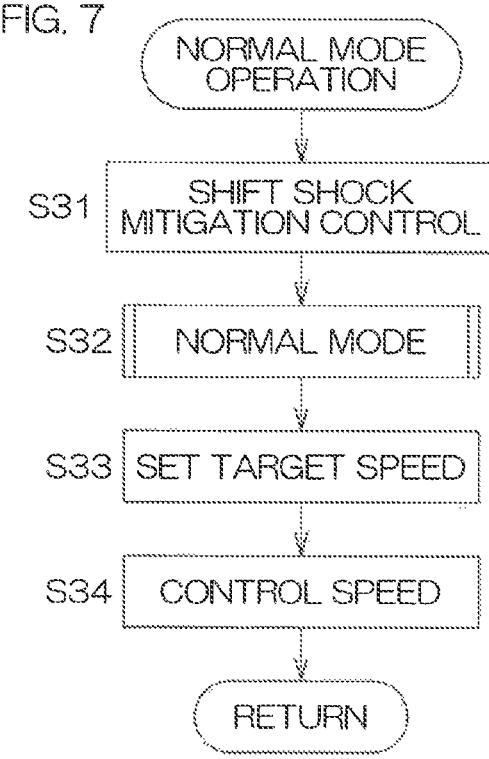

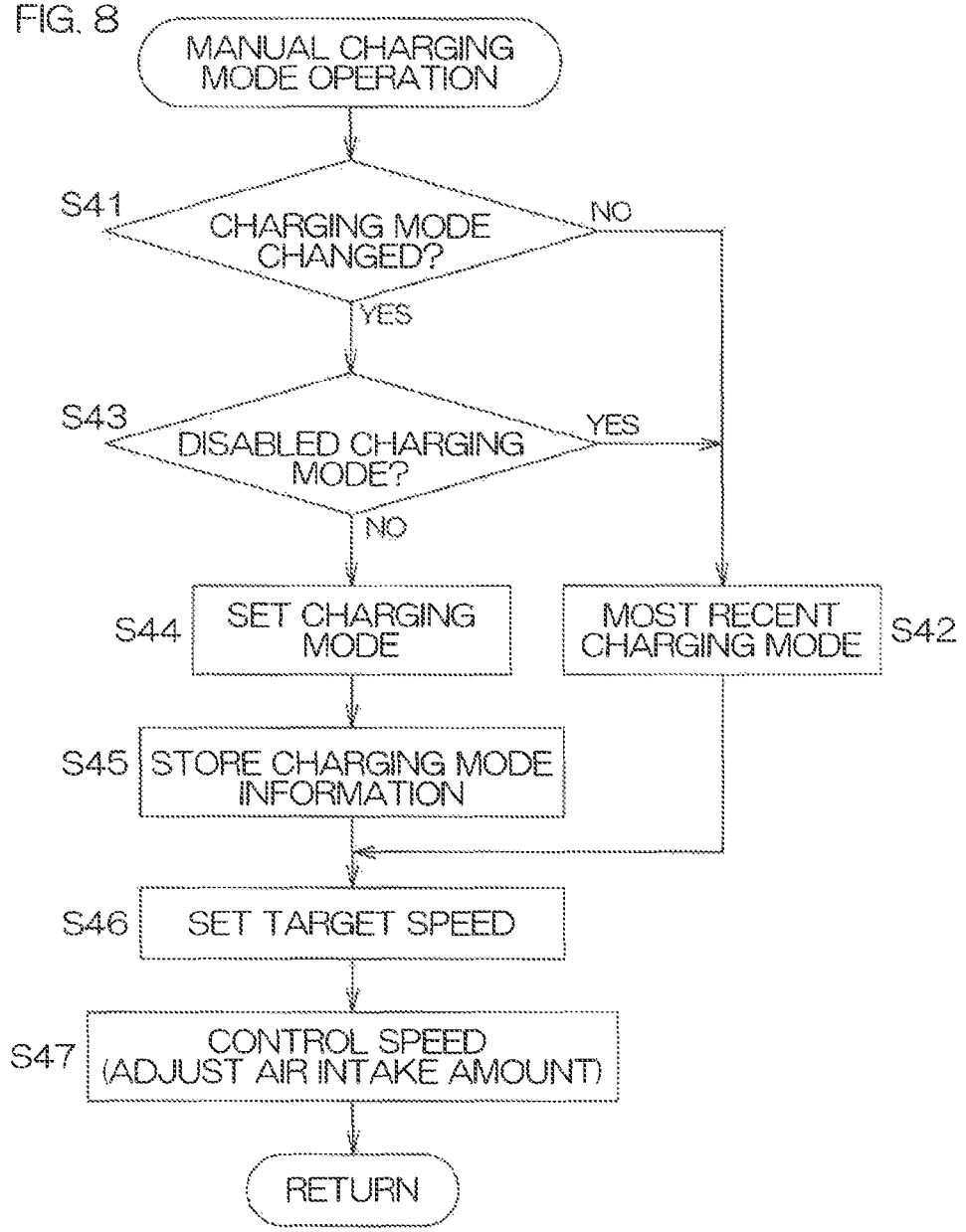

VESSEL PROPULSION DEVICE

BACKGROUND OF THE INVENTION

1. Field of the Invention

The present invention relates to a vessel propulsion device including a generator that is driven by an engine.

2. Description of the Related Art

An outboard motor is an example of a vessel propulsion device. An outboard motor includes an engine (internal combustion engine), a starter motor to start the engine, and a generator to be driven by the engine. The starter motor and the generator are connected to a battery. The starter motor is driven using electric power supplied from the battery to crank the engine. The generator is driven by the engine to generate electric power. The battery is charged with the electric power.

Electric power from the battery is supplied to the starter motor as well as to engine operation functional components to supply fuel and provide ignition. Electric power from the battery may also be supplied to accessories such as various indicators, navigational equipment, and illuminating lamps.

U.S. Pat. No. 5,685,802 discloses a control apparatus that increases the engine speed when the battery voltage becomes equal to or lower than a predetermined value, provided that the shift is in a neutral position. This allows the battery voltage to be recovered early and troubles such as an engine stop to be prevented.

SUMMARY OF THE INVENTION

The inventor of preferred embodiments of the present invention described and claimed in the present application conducted an extensive study and research regarding vessel propulsion devices, such as the one described above, and in doing so, discovered and first recognized new unique challenges and previously unrecognized possibilities for improvements as described in greater detail below.

A user, when discovering that the remaining battery level is decreasing, tries to operate the throttle lever to increase the engine speed and therefore increase the power generation to recover the remaining battery level immediately. More specifically, the outboard motor may include a free throttle mode to race the engine at the neutral position (see paragraph [0046] in US 2008/0026653 A1, for example). The user is able to use the free throttle mode to increase the engine speed higher than an idling speed for quick battery charging.

Such a charging operation utilizing the free throttle mode, however, requires the user to manually operate the throttle lever to increase the engine speed, which does not necessarily lead to controlling the engine speed for efficient charging. That is, since there is no indicator of an efficient engine speed, the engine speed may increase wastefully and cause unnecessary fuel consumption.

With the arrangement disclosed in U.S. Pat. No. 5,685,802, when the battery voltage decreases, the engine speed increases to a value higher than the speed according to the throttle opening degree. However, U.S. Pat. No. 5,685,802 does not consider how much the engine speed should increase in terms of efficient charging. For example, an increase in the engine speed results in an increase in fuel consumption, but not necessarily in a monotonic increase in power generation per unit fuel consumption, that is, the power generation efficiency. However, U.S. Pat. No. 5,685,802 does not disclose a defined amount of the increase in the engine speed in terms of maximizing the power generation efficiency. Furthermore, depending on the remaining battery level of, and the amount of load connected to the battery, and/or other conditions, a uniform increase in the engine speed does not necessarily charge the battery adequately.

Hence, preferred embodiments of the present invention provide a vessel propulsion device that is capable of charging a battery adequately.

In order to overcome the previously unrecognized and unsolved challenges described above, a preferred embodiment of the present invention provides a vessel propulsion device that transmits a drive force of an engine to a propulsive force generator and includes a generator to be driven by the engine, a power shutoff detector that detects a power shutoff state in which the drive force of the engine is not transmitted to the propulsive force generator, and a controller configured or programmed to, when the power shutoff detector detects the power shutoff state, allow selection of one of the plurality of charging modes to charge a battery connected to the generator and to control the target speed of the engine based on a selected one of the charging modes.

In accordance with the arrangement described above, one of the plurality of charging modes is able to be selected in the power shutoff state where the drive force of the engine is not transmitted to the propulsive force generator. Based on a selected one of the plurality of charging modes, the target speed of the engine is then controlled. Since the plurality of charging modes are prepared in advance, the target speed of the engine is likely to be set adequately. This allows the battery to be charged adequately.

The charging mode may be selected manually by a user or automatically by the controller. When the user selects the charging mode, the engine speed is not adjusted directly, but the target speed is controlled through selection of the charging mode. It is therefore easy to prevent the engine speed from increasing wastefully to cause unnecessary fuel consumption. In the case of automatic charging mode selection through processing by the controller, an appropriate one of the plurality of charging modes is selected according to various factors. This allows the battery to be charged adequately according to the present situation.

In a preferred embodiment of the present invention, the plurality of charging modes have different electricity generating efficiencies. "Electricity generating efficiency" is the power generation efficiency, and specifically refers to the power generation per unit fuel consumed by the engine. More specifically, "electricity generating efficiency" may be the current value generated by the generator divided by the flow rate of fuel flowing into the engine.

Selecting an appropriate one of the plurality of charging modes having different electricity generating efficiencies allows selection of the appropriate charging mode with a preference for electricity generating efficiency. This allows the target speed of the engine to be controlled in terms of maximizing the electricity generating efficiency to charge the battery adequately.

In a preferred embodiment of the present invention, the plurality of charging modes have different rates of power generated by the generator. Thus, selecting an appropriate one of the plurality of charging modes having different rates of power generation allows selection of the appropriate charging mode with preference for power generation. This allows the target speed of the engine to be controlled in terms of maximizing the power generation to charge the battery adequately.

In a preferred embodiment of the present invention, the controller is configured or programmed to select one of the charging modes based on the remaining level of the battery or the amount of load connected to the battery. In accordance with this arrangement, the charging mode is selected adequately according to the remaining level of the battery or the amount of load according to the present situation.

The amount of load may be evaluated based on the current flowing into/out of the battery.

In a preferred embodiment of the present invention, the plurality of charging modes include a first charging mode in which the generator generates electricity at a first power rate and a second charging mode in which the generator generates electricity at a second power rate higher than the first power rate. The controller is configured or programmed to select the second charging mode when the remaining level of the battery is lower than a first level threshold value.

In accordance with the arrangement described above, when the remaining level of the battery is low, the second charging mode is selected which has a higher power rate. Accordingly, adequate charge control is enabled according to the remaining level of the battery.

In a preferred embodiment of the present invention, the plurality of charging modes include a third charging mode in which the generator generates electricity at a third power rate and a fourth charging mode in which the generator generates electricity at a fourth power rate higher than the third power rate. The controller is then programmed to select the fourth charging mode when the amount of load connected to the battery is equal to or higher than a load threshold value.

In accordance with the arrangement described above, when the amount of load connected to the battery is large, the fourth charging mode is selected, which has a higher power rate. Accordingly, adequate charge control is enabled according to the amount of load.

In a preferred embodiment of the present invention, the controller is configured or programmed to, when the remaining level of the battery becomes equal to or higher than a second level threshold value during operation in a fifth charging mode of the plurality of charging modes, cause a transition to a sixth charging mode of the plurality of charging modes with a target speed lower than that in the fifth charging mode.

In accordance with the arrangement described above, when the remaining level of the battery is high, a transition is caused to the sixth charging mode with a lower target speed, such that the target speed is able to be controlled adequately and the fuel consumption is reduced.

A preferred embodiment of the present invention further includes a mode selector to be operated by a user to select one of the plurality of charging modes. The controller is then configured or programmed to control the target speed according to one of the charging modes selected through operation of the mode selector.

With the arrangement described above, the user is able to operate the mode selector to select one of the charging modes. The user is required not to adjust the engine speed directly but only to select one of the plurality of charging modes. The controller controls the target speed of the engine according to the selected charging mode. It is therefore easy to prevent, for example, the engine speed from increasing excessively, such that adequate charge control is achieved even when the battery is charged according to an operation by the user.

A preferred embodiment of the present invention further includes a propulsion operator, separate from the mode selector, to be operated by the user to adjust either one or both of the output power of the engine and the propulsive force of the vessel propulsion device. The controller is then configured or programmed to, when the power shutoff detector detects the power shutoff state, allow selection of one of the charging modes by the mode selector.

In accordance with the arrangement described above, the user is able to adjust the output power of the engine and/or the propulsive force of the vessel propulsion device by operating the propulsion operator. On the other hand, in the power shutoff state, the user is able to operate the mode selector to manually select the charging mode. This allows the power shutoff state to be a condition for manual selection of the charging mode. It is therefore possible to adjust the output power of the engine or the propulsive force of the vessel propulsion device with preference over the charging mode selection, which allows selection of the charging mode without interfering with the adjustment of the engine output power or the propulsive force.

Adjusting the engine output power may include adjusting the engine speed. Also, adjusting the propulsive force of the vessel propulsion device may include adjusting the magnitude of the propulsive force and/or may include selecting the direction (e.g., forward drive direction and reverse drive direction) of the propulsive force.

In a preferred embodiment of the present invention, the controller is configured or programmed to, in the power shutoff state, change the amount of air intake by the engine to achieve the target speed corresponding to the selected charging mode. That is, the controller controls the amount of air intake automatically according to the target speed.

In a preferred embodiment of the present invention, the engine includes a plurality of cylinders, and the controller is configured or programmed to, in at least one of the plurality of charging modes, stop the operation of at least one of the cylinders.

With the arrangement described above, since the operation of at least one of the cylinders is stopped in at least one of the charging modes, the fuel consumption during charging is reduced. Since the selection of the charging mode is enabled in the power shutoff state and thus the engine load during the selection of the charging mode is low, even if some of the cylinders are stopped, no trouble will occur in driving the generator. Stopping a cylinder in some of the plurality of charging modes would allow the charging mode to be selected with preference for fuel efficiency. This allows adequate charge control in terms of fuel efficiency.

In a preferred embodiment of the present invention, the controller is configured or programmed to calculate the remaining level of the battery based on SOC (State Of Charge). This allows the remaining level of the battery to be calculated accurately, which allows for manual or automatic selection of the charging mode according to the accurately calculated remaining level of the battery. This allows adequate charge control.

In a preferred embodiment of the present invention, the controller includes a normal mode including a first idling speed as the target speed. In at least one of the plurality of charging modes, the controller then sets a second idling speed that is higher than the first idling speed as the target speed.

With the arrangement described above, in at least one of the charging modes, the engine is operated at an idling speed higher than that in the normal mode. This causes the power rate by the generator to be higher than that in the normal mode, providing quick battery charging.

The normal mode may double as one of the plurality of charging modes.

In a preferred embodiment of the present invention, the controller is configured or programmed to, when the power shutoff detector no longer detects the power shutoff state during operation in one of the plurality of charging modes, select the normal mode.

In accordance with the arrangement described above, since the normal mode is selected automatically after leaving the power shutoff state, the battery is charged adequately without the charge control impacting the adjustment or control of the propulsive force of the vessel propulsion device.

In a preferred embodiment of the present invention, the controller is configured or programmed to, when the power shutoff detector detects the power shutoff state during operation in the normal mode, return to a most recently set one of the plurality of charging modes.

This causes the most recent charging mode to be restored when the power shutoff state occurs. Thus, particularly when the charging mode selection is left to a manual operation by the user, it is not necessary for the user to perform an operation of selecting the charging mode again. This allows the battery to be charged adequately according to the user's intention. Additionally, in the case of automatic charging mode selection, the controller takes over the last charging mode, such that an adequate one of the charging modes is more likely to be selected from the beginning of the power shutoff state. Therefore, this allows adequate charge control from the beginning of the power shutoff state.

In a preferred embodiment of the present invention, the controller is configured or programmed to, when the power shutoff detector no longer detects the power shutoff state, temporarily set a target speed lower than the first idling speed.

In accordance with the arrangement described above, the engine speed decreases temporarily after leaving the power shutoff state, which allows for smooth transition to a state of power transmission. More specifically, when a clutch is provided between the engine and the propulsive force generator, the clutch is subject to reduced shocks during clutch engagement.

The clutch may include a dog clutch. The clutch may also include a shifter with which one of a plurality of shift positions is able to be selected. In this case, the plurality of shift positions may include a forward drive shift position, a reverse drive shift position, and a neutral shift position. In the forward drive shift position, the propulsive force generator transmits the drive force of the engine to generate a propulsive force in the forward drive direction. In the reverse drive shift position, the propulsive force generator transmits the drive force of the engine to generate a propulsive force in the reverse drive direction. In the neutral shift position, no drive force is transmitted from the engine to the propulsive force generator. In this case, the state in which the shift is in the neutral shift position corresponds to the power shutoff state.

In a preferred embodiment of the present invention, the controller is configured or programmed to disable at least one of the plurality of charging modes according to either one or both of the remaining level of the battery and the amount of load connected to the battery. In accordance with this arrangement, some of the charging modes are disabled according to the remaining level of the battery and/or the amount of load. This prevents selection of an inadequate charging mode such that adequate charge control is achieved. This is significantly beneficial in that selection of an inadequate charging mode is prevented particularly when the charging mode selection is left to a manual operation by the user. Also, in the case of automatic charging mode selection by the controller, since the number of enabled charging mode selections is reduced, the amount of processing by the controller to select the appropriate charging mode is reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 shows an example of a combination of plural charging modes.

FIG. 3 shows another example of a combination of plural charging modes.

FIG. 5 is a flowchart illustrating an example of the charge control performed by the engine ECU.

FIG. 6 is a flowchart illustrating an example of the charge control performed by the engine ECU in the automatic charging mode.

FIG. 7 is a flowchart illustrating an example of the charge control performed by the engine ECU in the normal mode.

FIG. 8 is a flowchart illustrating an example of the charge control performed by the engine ECU in the manual charging mode.

DETAILED DESCRIPTION OF THE PREFERRED EMBODIMENTS

Figure 1:
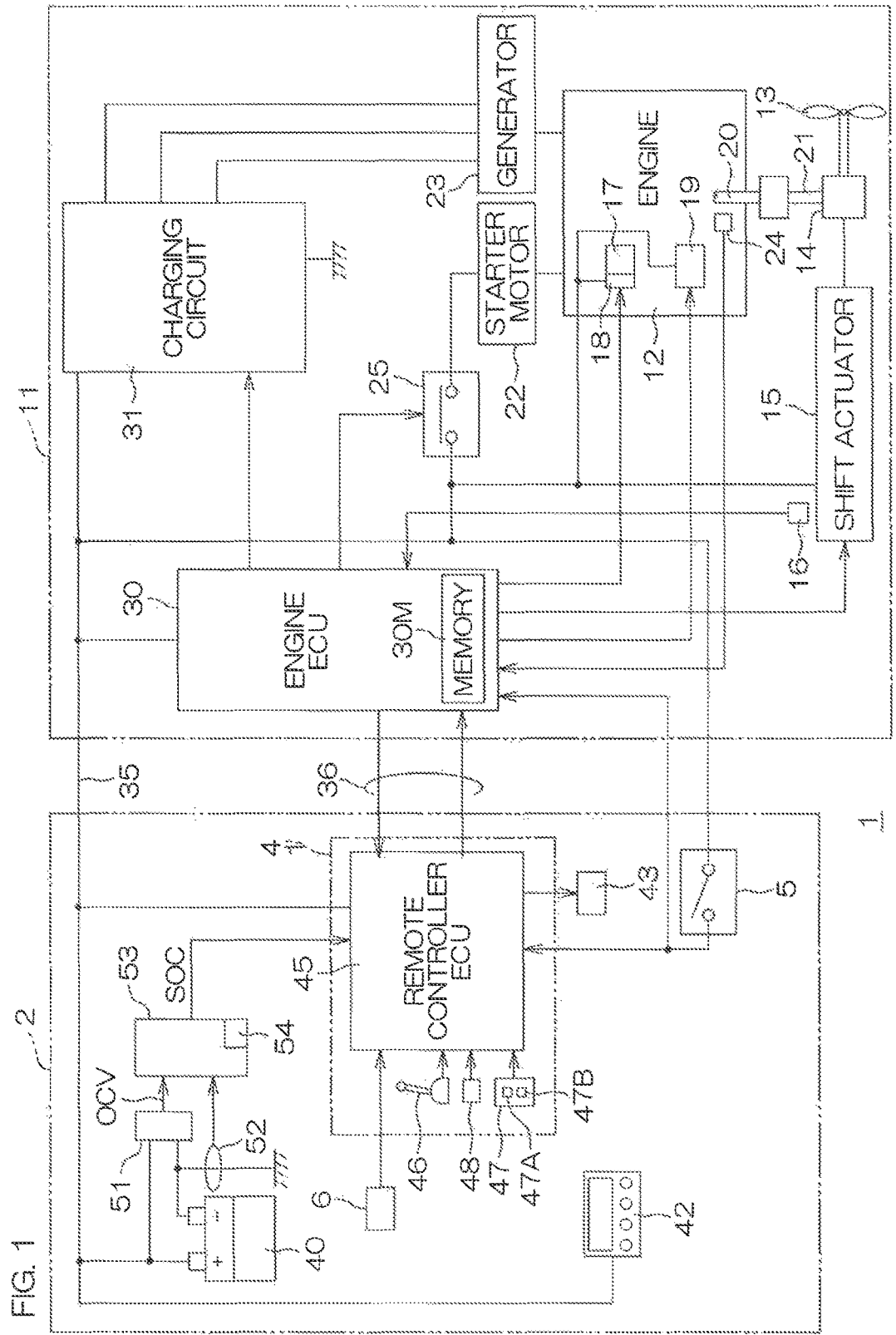
FIG. 1 is a block diagram illustrating the electrical configuration of a vessel equipped with a vessel propulsion device according to a preferred embodiment of the present invention.

FIG. 1 is a block diagram illustrating the electrical configuration of a vessel equipped with a vessel propulsion device according to a preferred embodiment of the present invention. The vessel 1 includes a hull 2 and a vessel propulsion device 11 installed on the hull 2. The vessel propulsion device 11 may be an outboard motor, for example.

The vessel propulsion device 11 includes an engine (internal combustion engine) 12, a propeller 13 that is a non-limiting example of a propulsive force generator to be driven by the engine 12, and a shifter 14 provided in a power transmitting path from the engine 12 to the propeller 13. The shifter 14 is a non-limiting example of a drive force transmission in which one of a plurality of shift positions is able to be selected. The shifter 14 is also an example of a clutch that switches between a power transmitting state in which a drive force is transmitted from the engine 12 to the propeller 13 and a power shutoff state where the transmission of the drive force is shut off.

The plurality of shift positions include a forward drive shift position at which the rotation of the engine 12 is transmitted to the propeller 13 to be rotated in one direction (forward drive direction), a reverse drive shift position at which the rotation of the engine 12 is transmitted to the propeller 13 to be rotated in the other direction (reverse drive direction), and a neutral shift position (neutral position) at which the rotation of the engine 12 is not transmitted to the propeller 13. At the forward drive shift position, the propeller 13 generates a propulsive force in the forward drive direction to move the hull 2 forward. At the reverse drive shift position, the propeller 13 generates a propulsive force in the reverse drive direction to move the hull 2 rearward. At the neutral shift position, the propeller 13 generates no propulsive force. That is, the neutral shift position provides a power shutoff state where no drive force is transmitted from the engine 12 to the propeller 13.

In a preferred embodiment of the present invention, the shifter 14 is actuated by a shift actuator 15 and controlled to have one of the plurality of shift positions. A shift position sensor 16 is provided to detect the shift position. The shift position sensor 16 may be a neutral switch that detects whether or not the shift position is neutral. The shift position sensor 16 may be a position sensor or switch that detects the position of a movable portion of the shift actuator 15. The shift position sensor 16 is an example of a power shutoff detector that detects the power shutoff state (neutral shift position).

In a preferred embodiment of the present invention, the engine 12 includes an electronically-controlled throttle device 17 and a fuel injection valve 19. The electronically-controlled throttle device 17 includes a throttle actuator 18 that changes the throttle opening degree of the engine 12. When the throttle actuator 18 is driven, the output of the engine 12 (more specifically, the engine speed) changes. In addition, controlling the amount of fuel injection using the fuel injection valve 19 allows the output of the engine 12 (more specifically, the engine speed) to be changed. The engine 12 includes a crankshaft 20 and the crankshaft 20 is coupled via a drive shaft 21 to the shifter 14. The crankshaft 20 is coupled with a starter motor 22 and a generator 23. The starter motor 22 rotates the crankshaft 20 upon starting the engine. The generator 23 is driven by the engine 12 under operation to generate electric power.

The vessel propulsion device 11 further includes an engine ECU (Electronic Control Unit) 30. The engine ECU 30 is configured or programmed to control the shift actuator 15, the throttle actuator 18, the fuel injection valve 19, etc. A detection signal from a crank sensor 24 that detects rotational information of the crankshaft 20 is input to the engine ECU 30. This allows the engine ECU 30 to obtain an engine speed. An output signal from the shift position sensor 16 is also input to the engine ECU 30. This allows the engine ECU 30 to acquire the shift position information of the shifter 14 (e.g., about whether or not the shift position is neutral). Instead of providing the shift position sensor 16, the engine ECU 30 may acquire the shift position information of the shifter 14 based on a command history to the shift actuator 15.

The vessel propulsion device 11 further includes a charging circuit 31. The charging circuit 31 includes a rectifying circuit that converts alternating current generated by the generator 23 into direct current and outputs the converted power to a power line 35. The power line 35 is connected with the shift actuator 15, the throttle actuator 18, the fuel injection valve 19, the starter motor 22, the engine ECU 30, the charging circuit 31, etc. The starter motor 22 is connected via a starter relay 25 to the power line 35. The starter relay 25 is turned on/off by the engine ECU 30. When the starter relay 25 is turned on, the starter motor 22 is powered and driven to rotate the crankshaft 20.

The hull 2 is equipped with a battery 40, a remote controller 41, and accessories 42 such as navigational equipment. The battery 40 is connected via the power line 35 to the vessel propulsion device 11.

The remote controller 41 includes a remote controller ECU 45. The remote controller ECU 45 is connected to the power line 35. The remote controller 41 includes a control lever 46 to be operated by a user (driver) to shift the vessel propulsion device 11 and control power. A control signal from the control lever 46 is input to the remote controller ECU 45. The remote controller 41 also includes a charging mode selector switch 47 to be operated by the user to switch the charging modes of the battery 40. The remote controller 41 further includes a charging mode automatic selection switch 48 to be operated by the user to set whether or not the charging mode selection is controlled automatically by the engine ECU 30.

The remote controller ECU 45 is connected through a signal line 36 to the engine ECU 30. The signal line 36 may include a local area network (inboard LAN).

The remote controller ECU 45 is configured or programmed to generate a shift command signal and a power command signal according to an operation of the control lever 46 and transmit the signals through the signal line 36 to the engine ECU 30. The engine ECU 30 is configured or programmed to control the shift actuator 15 according to the shift command signal and control the throttle actuator 18 according to the power command signal. Thus, operating the control lever 46 allows a shift position of the vessel propulsion device 11 (a state of the shifter 14) to be selected and the throttle opening degree (i.e., output power of the engine 12) to be adjusted.

The remote controller ECU 45 is also configured or programmed to generate a charging mode switching command signal according to an operation of the charging mode selector switch 47 and transmit the signal through the signal line 36 to the engine ECU 30. The engine ECU 30 is configured or programmed to switch the charging modes according to the charging mode switching command signal. The charging mode selector switch 47 is an example of a mode selector. The charging mode selector switch 47 may include an up switch 47A and a down switch 47B. In this case, one of the charging modes is able to be selected by operating the up switch 47A and the down switch 47B. The charging modes and the switching control therefor will be described below. The remote controller ECU 45 is further configured or programmed to, when the automatic charging mode selection is set using the charging mode automatic selection switch 48, transmit the set signal through the signal line 36 to the engine ECU 30.

The remote controller ECU 45 is connected with an indicator 43 to indicate, for example, the engine speed, the remaining battery level, and various alarms. The remote controller ECU 45 provides an indication control signal to the indicator 43 according to which operation is being performed on the indicator 43.

The remote controller ECU 70 is further connected with a main switch 5. The main switch 5 is connected to the power line 35. The main switch 5 is operated by the user to apply power to the vessel propulsion device 11. When the main switch 5 is turned on, the remote controller ECU 45 and the engine ECU 30 are activated. The remote controller ECU 45 is further connected with a starter switch 6 to be operated by the user to start the engine 12. When a start command is provided from the starter switch 6, the remote controller ECU 45 provides an engine start command via the signal line 36 to the engine ECU 30. In response to this, the engine ECU 30 performs start control. The start control includes turning the starter relay 25 on and starting a fuel injection operation by the fuel injection valve 19. When use of the vessel propulsion device 11 is terminated, the user turns the main switch 5 off to stop powering the vessel propulsion device 11 and thus stop the engine 12.

The battery 40 mainly supplies electric power to be used in the vessel propulsion device 11. More specifically, the battery 40 is a power source included in the vessel 1 with the main purpose of powering the starter motor 22 when starting the engine 12. On the other hand, in a preferred embodiment of the present invention, the battery 40 is also used as a power supply for the electrical components included in the vessel 1 other than the vessel propulsion device 11, that is, the accessories 42. A non-limiting example of the accessories 42 is navigational equipment such as fish sonar. The battery 40 is a secondary battery that is charged with electric power supplied via the power line 35 from the vessel propulsion device 11 during operation of the engine 12. In addition to the battery 40, another battery (accessory battery) may be provided to power the accessories. In this case, electric power supplied via the power line 35 from the vessel propulsion device 11 also charges the accessory battery.

The battery 40 is connected with an OCV sensor 51. The OCV sensor 51 detects the open circuit voltage (OCV) of the battery 40. In association with the battery 40, a current sensor 52 is further provided to detect the current flowing into/out of the battery 40. An output signal from the OCV sensor 51 and an output signal from the current sensor 52 are input to a battery remaining level processor 53.

The battery remaining level processor 53 is configured or programmed to monitor an output signal from the current sensor 52 to determine that the battery 40 is unloaded and in equilibrium when the current flowing into/out of the battery 40 is considered to be zero or substantially zero for a predetermined period of time or longer. The battery remaining level processor 53 then, when the battery 40 is unloaded and in equilibrium, acquires an output signal (open circuit voltage) OCV from the OCV sensor 51 at predetermined time intervals (e.g., every four hours) and store it in the memory 54. The memory 54 may be provided internally or externally to the battery remaining level processor 53. The battery remaining level processor 53 is further configured or programmed to, when the open circuit voltage OCV within the memory 54 is updated, obtain an initial remaining level SOC (0) of the battery 40 based on the updated open circuit voltage OCV. The battery remaining level processor 53 is thus configured or programmed to, when the battery 40 is unloaded and in equilibrium, obtain the initial remaining level SOC (0) at predetermined time intervals (e.g., every four hours). "Initial remaining level" is an initial value of the remaining battery level at the time of the next connection of a load to the battery 40. Since there is a predetermined correlation between the open circuit voltage (OCV) and the remaining battery level (e.g., SOC: State Of Charge), the initial remaining level SOC (0) is obtained based on the correlation. For example, OCV-SOC property data for the battery 40, which indicates a correlative property between the open circuit voltage and the remaining battery level, is stored in the memory 54. The battery remaining level processor 53 is able to refer to the OCV-SOC property data to obtain the initial remaining battery level SOC (0) corresponding to the open circuit voltage OCV. The obtained initial remaining battery level SOC (0) is stored in the memory 54.

The battery remaining level processor 53 is configured or programmed to, when some current flows into/out of the battery 40, compute and output a remaining battery level SOC of the battery 40 at predetermined time intervals (e.g., every one second) based on the initial remaining battery level SOC (0) and a current detected by the current sensor 52. For example, the battery remaining level processor 53 is configured or programmed to apply a negative sign to the current in the direction flowing out of the battery 40, while applying a positive sign to the current in the direction flowing into the battery 40 to obtain a variate ΔSOC in the remaining battery level corresponding to the current. The battery remaining level processor 53 integrates the variate ΔSOC with respect to the initial remaining battery level SOC (0) to obtain the remaining battery level SOC. Thus, computing the remaining battery level SOC is a computation that obtains the remaining battery level SOC of the battery 40 based on the initial remaining battery level SOC (0) and an integrated value of the current flowing into/out of the battery 40.

The remaining battery level SOC computed by the battery remaining level processor 53 is input to the remote controller ECU 45. The remaining battery level SOC may be indicated by the indicator 43. The battery remaining level processor 53 is further configured or programmed to inform the remote controller ECU 45 of a current value detected by the current sensor 52. The current value, when it indicates that the current is drawn out of the battery 40, represents a consumption current drawn from the battery 40 and consumed, that is, a load on the battery 40.

The OCV sensor 51, the current sensor 52, the battery remaining level processor 53, and the memory 54 may be integrated as a battery module together with the battery 40.

FIG. 2 shows an example of a combination of plural charging modes.

The engine ECU 30 is configured or programmed to, when the shifter 14 is in the neutral shift position, control the target speed of the engine 12 according to a selected one of the plurality of charging modes and thus control the charging of the battery 40. A selection among the charging modes may be made by the user through operation of the charging mode selector switch 47. When the automatic charging mode selection is set using the charging mode automatic selection switch 48, the engine ECU 30 makes an automatic selection among the charging modes according to the present situation.

In a more specific description, the engine ECU 30 is configured or programmed to, in the neutral shift position, select one of the plurality of idling levels Lv−1, Lv0, Lv1, Lv2, Lv3 each having a different target engine speed during idling (hereinafter referred to as "idling target speed"). The engine ECU 30 is configured or programmed to control the idling speed of the engine 12 based on the selected idling level.

For example, the idling level Lv0 corresponds to a normal mode and, in this mode, the idling speed is 700 rpm, for example. The normal mode is an engine control mode at a shift-in position (forward drive shift position or reverse drive shift position). However, the idling level Lv0 is also one of the charging modes selected automatically by the engine ECU 30 or selected manually by the user using the charging mode selector switch 47.

The idling levels Lv−1, Lv0, Lv1, Lv2, Lv3 therefore correspond to a plurality of charging modes. In the charging mode of the idling level Lv−1, an idling speed lower than that in the normal mode is set, which is, for example, 550 rpm in the example of FIG. 2. For the idling levels Lv1, Lv2, Lv3, idling speeds higher than that in the normal mode are set, which are, for example, 1000 rpm, 1500 rpm, 2000 rpm, respectively, in the example of FIG. 2.

The higher the idling level (i.e., the higher the idling speed), the higher the amount of current is generated by the generator 23. FIG. 2 shows the current that is able to be drawn out of the engine 12 after deduction of the current consumed by the engine 12 itself such as those consumed by the throttle actuator 18 and the fuel injection valve 19. Specifically, currents of, for example, 0 A, 15 A, 18 A, 20 A, 21 A are generated at the respective idling levels Lv−1, Lv0, Lv1, Lv2, Lv3. Similarly, the higher the idling level (i.e., the higher the idling speed), the higher the fuel flow rate (liter/minute) to the engine 12. However, the fuel flow rate is not necessarily proportional to the idling speed.

The example of FIG. 2 shows that the higher the idling level (i.e., the higher the idling speed), the lower the "electricity generating efficiency," which is represented by the current generated per unit fuel flow rate (1 liter/minute). This is for the reason that the rate of increase in the fuel flow rate with an increase in the idling speed is greater than the rate of increase in the current generated with an increase in the idling speed. Depending on the type (characteristics) of the engine 12, the electricity generating efficiency does not necessarily become lower with a higher idling level (i.e., higher idling speed). For example, the engine 12 may have electricity generating efficiency characteristics (electricity generating efficiency-idling speed characteristics) in which with an increase in the idling speed, the electricity generating efficiency increases until a certain speed value is reached, but starts to decrease at that value.

In the idling level Lv−1, no current is drawn out of the engine 12. This charging mode is appropriate when the remaining battery level SOC preferably is, for example, 95% or higher (in an approximately fully charged state).

The idling level Lv0 has a remaining battery level SOC (e.g., 70% to 95%) at which charging is recommended, and is appropriate when the current consumption of the load connected to the battery 40 is less than, for example, 15 A. The idling level Lv1 has a remaining battery level SOC (e.g., 70% to 95%) at which charging is recommended, and is appropriate when the current consumption of the load connected to the battery 40 is, for example, less than 18 A. The idling level Lv2 then has a remaining battery level SOC (e.g., 70% to 95%) at which charging is recommended, and is appropriate when the current consumption of the load connected to the battery 40 is, for example, less than 20 A. Also, the idling level Lv3 has a remaining battery level SOC (e.g., 70% to 95%) at which charging is recommended, and is appropriate when the current consumption of the load connected to the battery 40 is, for example, equal to or more than 20 A. The idling level Lv3 is also appropriate at a remaining battery level SOC (e.g., lower than 70%) at which charging should be performed immediately.

The idling level Lv3, at which the maximum current is generated, is appropriate for selecting when the remaining battery level SOC decreases significantly. On the other hand, since the idling level Lv3 has a very low electricity generating efficiency, it is more preferable to select the idling level Lv2 as long as the remaining battery level SOC does not interfere with the driving of the starter motor 22. In terms of the fuel consumption (fuel flow rate), it is preferable to make a selection among the charging modes of the idling levels Lv1, Lv0, Lv−1 when the remaining battery level SOC allows.

FIG. 3 shows another example of a combination of plural charging modes similar to that in FIG. 2. In this example, a cylinder stop operation is performed during idling. More specifically, when the engine 12 is, for example, a four-cylinder engine including four cylinders, the operation of some (e.g., two) of the cylinders is stopped during idling at the neutral shift position. That is, the fuel injection is stopped in the stopped cylinder. This causes the fuel flow rate to become half that in FIG. 2.

At the neutral shift position, since the engine 12 is under a light load, an engine torque sufficient to drive the generator 23 even during the cylinder stop operation is ensured. Hence, the cylinder stop operation allows the fuel flow rate and therefore the fuel efficiency to be halved thus doubling the electricity generating efficiency.

The cylinder stop operation is not required in all of the charging modes, but may be used only in some of the charging modes. In this case, a selection among the charging modes that use the cylinder stop operation is advantageously made when preference is put on fuel efficiency.

Figure 4:
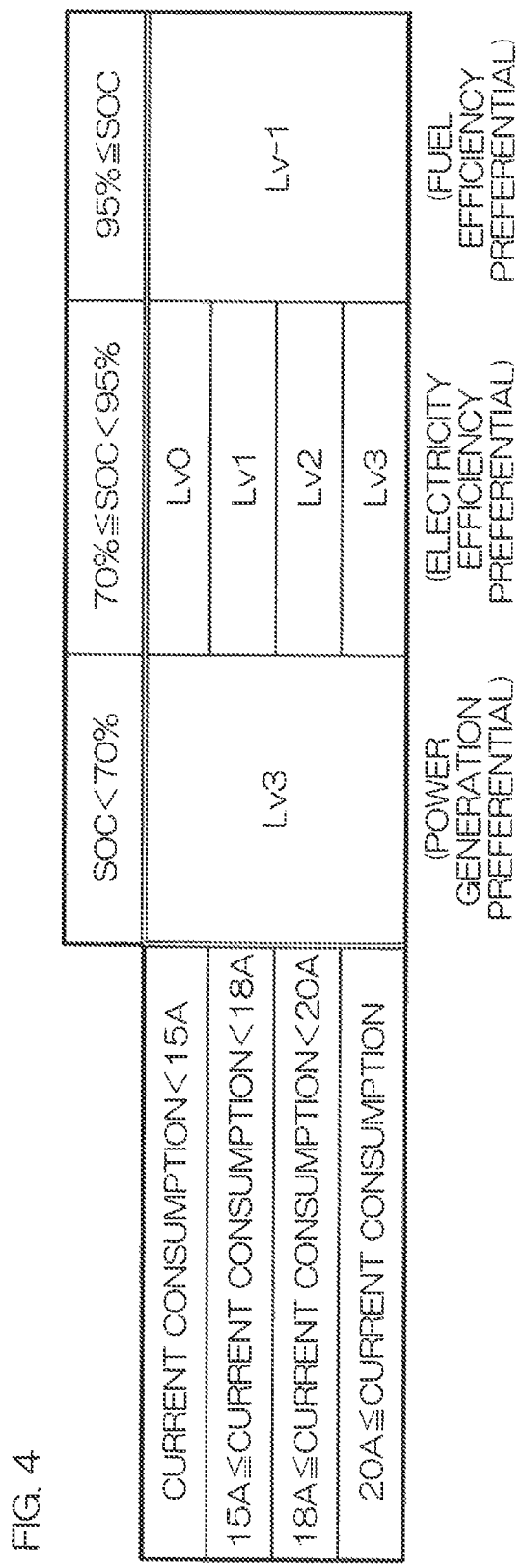
FIG. 4 shows an example of criteria for selecting the charging mode including a map.

FIG. 4 shows an example of the criteria for charging mode (idling level) selection. For example, a map indicating such selection criteria may be stored in a memory 30M of the engine ECU 30. According to the criteria in FIG. 4, the idling level Lv−1 is selected when the remaining battery level SOC is 95% (an example of the level threshold value) or higher. That is, the charging mode is selected in which the power generation by the engine 12 is zero and the idling speed is low to maximize the fuel efficiency when preference is put on fuel efficiency. Also, the idling level Lv3 is selected when the remaining battery level SOC is lower than 70% (an example of the level threshold value). That is, the charging mode is selected in which the power generation by the engine 12 is maximized for quick charging of the battery 40 with preference put on the power generation.

When the remaining battery level SOC is within the range from 70% to 95%, one of the idling levels Lv0 to Lv3 is selected depending on the amount of load connected to the battery 40 and the electricity generating efficiency. More specifically, the charging mode with the maximum electricity generating efficiency is selected within the idling level range in which the power generation is greater than the consumption current flowing out of the battery 40. That is, the charging mode is selected with preference put on electricity generating efficiency.

In the examples of FIGS. 2 and 3, since the electricity generating efficiency descends in the order of the idling levels Lv0, Lv1, Lv2, Lv3, the idling level Lv0 is selected when the current consumption is less than 15 A (an example of the load threshold value). Also, the idling level Lv1 is selected when the current consumption is 15 A to 18 A (an example of the load threshold value). Similarly, the idling level Lv2 is selected when the current consumption is 18 A to 20 A (an example of the load threshold value). The idling level Lv3 is then selected when the current consumption is equal to or greater than 20 A, for example.

Unlike the examples of FIGS. 2 and 3, when the electricity generating efficiency (i.e., the power generation efficiency) of the idling level Lv3 is higher than the electricity generating efficiency of the idling level Lv2, the idling level Lv3 will appropriately be selected in terms of preference on the electricity generating efficiency even when the current consumption may be within the range from 18 A to 20 A, for example.

FIGS. 5 to 8 are flowcharts for illustrating an example of the operation of the charge control performed by the engine ECU 30, showing an example performed by the engine ECU 30 repeatedly at a predetermined control cycle.

The engine ECU 30 determines whether start control is performed to start the engine 12 and, during the start control, waits for its termination (Step S1). In the start control, the starter relay 25 is turned on to drive the starter motor 22 and the throttle opening degree and the amount of fuel injection are controlled to be an appropriate value for the engine 12.

During the start control, the engine ECU 30 puts preference on starting the engine 12, and does not allow for charging mode selection. Specifically, in this preferred embodiment, manual charging mode selection through an operation of the charging mode selector switch 47 is disabled. In this preferred embodiment, since the engine ECU 30 does not start control for automatic charging mode selection during the start control, the automatic charging mode selection is also substantially disabled. The start control may include a warm-up control until the engine 12 is heated to a predetermined temperature.

When the start control for the engine 12 is terminated (Step S1: NO), the engine ECU 30 acquires shift position information of the shifter 14 (particularly whether or not it is in the neutral shift position) from the shift position sensor 16 (Step S2). The engine ECU 30 also acquires, from the remote controller ECU 45, the remaining battery level SOC output from the battery remaining level processor 53 (Step S3). The engine ECU 30 further acquires, from the remote controller ECU 45, the current consumption (the current flowing into or out of the battery 40) (Step S4). The remote controller ECU 45 provides current information, which is detected by the current sensor 52 and acquired from the battery remaining level processor 53, via the signal line 36 to the engine ECU 30. The engine ECU 30 then communicates with the remote controller ECU 45 via the signal line 36 to acquire automatic selection setting information indicating when the automatic charging mode selection is set using the charging mode automatic selection switch 48 (Step S5). The engine ECU 30 further checks the state of the charging mode selector switch 47 (Step S6). Specifically, the engine ECU 30 communicates with the remote controller ECU 45 to acquire information indicating when an operation is performed on the charging mode selector switch 47 from the previous control cycle to the present control cycle.

Based on the thus acquired information, the engine ECU 30 determines whether the shifter 14 is in the neutral shift position (Step S7). If not in the neutral shift position (Step S7: NO), the engine ECU 30 performs an engine operation in the normal mode (normal mode operation) (Step S8). If the shifter 14 is in the neutral shift position (Step S7: YES), the engine ECU 30 determines whether the automatic charging mode selection is set (Step S9). If the automatic charging mode selection is set (Step S9: YES), the engine ECU 30 performs an automatic charging mode operation to charge the battery 40 during which an automatic selection among the charging modes is made (Step S10). On the other hand, when the automatic charging mode selection is not set (Step S9: NO), the engine ECU 30 performs a manual charging mode operation to charge the battery 40 with a charging mode selected through a manual operation of the charging mode selector switch 47 (Step S11).

FIG. 6 shows an example of a control during the automatic charging mode operation. The engine ECU 30 selects one of the plurality of charging modes (see FIGS. 2 and 3) (Step S21). More specifically, the engine ECU 30 selects the charging mode based on the remaining battery level SOC, the current consumption (the amount of load), etc. The charging mode selection may be made based on, for example, a map with the contents shown in FIG. 4 described above. The engine ECU 30 stores information on the selected charging mode in the memory 30M (Step S22).

The engine ECU 30 then sets a target speed corresponding to the selected charging mode (idling levels Lv-1 to Lv3) (Step S23; see both FIGS. 2 and 3). Based on the target speed, the engine ECU 30 then controls the speed of the engine 12 (Step S24).

More specifically, the engine ECU 30 controls the throttle actuator 18 to control the throttle opening degree and thus adjust the amount of air taken into the engine 12 (the amount of air intake). The engine ECU 30 further sets an amount of fuel injection according to the throttle opening degree and drives the fuel injection valve 19 according to the set amount of fuel injection. On the other hand, the engine ECU 30 computes an actual engine speed based on an output signal from the crank sensor 24. The engine ECU 30 controls, for example, the throttle opening degree, etc., such that the actual engine speed achieves the target engine speed and thus controls the speed of the engine 12.

Under such control, the process performed by the engine ECU 30 returns to Step S1 in FIG. 5. That is, the engine ECU 30 monitors when the shifter 14 is in the neutral shift position (Step S7) and when the automatic charging mode selection is set continuously (Step S9). If the shifter 14 is in the neutral shift position (Step S7: YES) and the automatic charging mode selection is set continuously (Step S9: YES), the engine ECU 30 continuously performs the automatic charging mode operation (Step S10, FIG. 6).

If switched to a shift position other than the neutral shift position, that is, a shift-in position (forward drive shift position or reverse drive shift position) (Step S7: NO), the engine ECU 30 terminates the running charging mode and changes to the normal mode operation (Step S11).

FIG. 7 shows an example of the control performed by the engine ECU 30 in the normal mode operation. The engine ECU 30 performs shift shock mitigation control upon starting the normal mode operation (Step S31). In the shift shock mitigation control, the speed of the engine 12 is reduced temporarily to a shift shock mitigation speed that is lower than the idling speed in the normal mode (see FIG. 2). This reduces the shock upon shift-in of the shifter 14. For example, the shifter 14 includes a dog clutch as a jaw clutch. The shift shock mitigation control allows the shock upon engagement of the dog clutch to be reduced and thus the shift-in feeling is improved.

After the shift shock mitigation control (Step S31), the engine ECU 30 controls the target speed according to the normal mode (Steps S32, S33). Thus, controlling the target speed according to the normal mode causes the engine ECU 30 to set a target speed according to the amount of operation of the control lever 46 (Step S33) and control the throttle opening degree, such that the target speed is achieved, to control the speed of the engine 12 (Step S34). The speed of the engine 12 is thus controlled to follow the operation by the user.

Under such control, the process performed by the engine ECU 30 returns to Step S1 in FIG. 5. That is, the engine ECU 30 monitors when the shifter 14 is in the neutral shift position (Step S7). If the shift-in position is maintained (Step S7: NO), the engine ECU 30 continuously performs the normal mode operation (Step S8, FIG. 7). If a change into the neutral shift position occurs (Step S7: YES), the engine ECU 30 determines when the automatic charging mode selection is set (Step S9). If the automatic charging mode selection is set (Step S9: YES), the engine ECU 30 performs the automatic charging mode operation (Step S10, FIG. 6). On the other hand, when the automatic charging mode selection is not set (Step S9: NO), the engine ECU 30 performs the manual charging mode operation (Step S11).

FIG. 8 shows an example of the control performed by the engine ECU 30 in the manual charging mode operation. The engine ECU 30 determines whether the charging mode selector switch 47 is operated, that is, whether the charging mode is changed by the user (Step S41). If there is no charging mode change operation (Step S41: NO), the engine ECU 30 refers to the memory 30M to select the most recently selected charging mode (Step S42) and sets the target speed according to the charging mode (Step S46) to control the speed of the engine 12 such that the target speed is achieved (Step S47). Like the automatic charging mode operation and the normal mode operation, this speed control also includes, for example, control of the throttle opening degree, that is, control of the amount of air intake.

If there is a charging mode change operation (Step S41: YES), the engine ECU 30 determines whether the changed charging mode is a disabled charging mode (Step S43). The engine ECU 30 may set the disabled charging mode based on, for example, the remaining battery level SOC. For example, when the remaining battery level SOC is lower than a predetermined threshold value (e.g., 70%), the charging modes of the idling levels Lv−1 to Lv2 (i.e., other than the idling level Lv3) are set as a disabled charging mode (see FIG. 4). Alternatively, the engine ECU 30 may set the disabled charging mode based on the current consumption (battery load). More specifically, when the current consumption is equal to or greater than 20 A, for example, the charging modes of the idling levels Lv−1 to Lv2 may be disabled, while the charging mode of the idling level Lv3 may be enabled. Also, when the current consumption is equal to or greater than 18 A, for example, the charging modes of the idling levels Lv−1 to Lv1 may be disabled, while the charging modes of the idling levels Lv2, Lv3 may be enabled. Then, when the current consumption is equal to or greater than 15 A, for example, the charging modes of the idling levels Lv−1, Lv0 may be disabled, while the charging modes of the idling levels Lv1 to Lv3 may be enabled.

If the charging mode changed through an operation of the charging mode selector switch 47 is disabled (Step S43: YES), the engine ECU 30 refers to the memory 30M to select the most recently selected charging mode (Step S42) and set the target speed according to the charging mode (Step S46) to control the speed of the engine 12 such that the target speed is achieved (Step S47).

On the other hand, when the changed charging mode is enabled (Step S43: NO), the engine ECU 30 sets the charging mode (Step S44) and stores information indicating the set charging mode in the memory 30M (Step S45). The engine ECU 30 then sets a target speed according to the charging mode (Step S46) and controls the speed of the engine 12 such that the target speed is achieved (Step S47).

Under such control, the process performed by the engine ECU 30 returns to Step S1 in FIG. 5. That is, the engine ECU 30 monitors when the shifter 14 is in the neutral shift position (Step S7) and when the automatic charging mode selection is set (Step S9). If the shifter 14 is in the neutral shift position (Step S7: YES) and the automatic charging mode selection is not set (Step S9: NO), the engine ECU 30 continuously performs the manual charging mode operation (Step S11, FIG. 8).

If the automatic charging mode selection is set (Step S9: YES), the engine ECU 30 performs the automatic charging mode operation (Step S10, FIG. 6). If the shifter 14 is switched to a shift position other than the neutral shift position, that is, a shift-in position (forward drive shift position or reverse drive shift position) (Step S7: NO), the engine ECU 30 terminates the running charging mode and changes to the normal mode operation (Step S11).

As described above, in accordance with a preferred embodiment of the present invention, a selection among the plurality of charging modes for charging of the battery 40 is made in the neutral shift position, and the engine ECU 30 controls the target speed of the engine 12 based on a selected one of the charging modes. Since the plurality of charging modes are prepared in advance, an appropriate target speed of the engine 12 is likely to be set. This allows the battery 40 to be adequately charged.

When a selection among the charging modes is made through a manual operation of the charging mode selector switch 47 by the user, the target speed is controlled with no direct adjustment of the engine speed through an operation of the control lever 46. It is therefore easy to prevent the engine speed from increasing wastefully to cause unnecessary fuel consumption. Also, in the case of automatic charging mode selection through control by the engine ECU 30, an appropriate one of the plurality of charging modes is selected according to various factors such as the remaining battery level SOC and the current consumption. This allows the battery 40 to be adequately charged according to the present situation.

In a preferred embodiment of the present invention, the plurality of charging modes have different electricity generating efficiencies. Thus, selecting an appropriate one of the plurality of charging modes having different electricity generating efficiencies allows for appropriate charging mode selection with preference for electricity generating efficiency. This allows the target speed of the engine to be controlled in terms of maximizing the electricity generating efficiency to adequately charge the battery 40.

In a preferred embodiment of the present invention, the plurality of charging modes also have different rates of power generated by the generator 23. Thus, selecting an appropriate one of the plurality of charging modes having different rates of power generation allows for appropriate charging mode selection with preference for power generation. This allows the target speed of the engine to be controlled in terms of maximizing the power rate to adequately charge the battery 40.

In a preferred embodiment of the present invention, the engine ECU 30, in the automatic charging mode operation, makes a selection among the charging modes based on the remaining battery level SOC or the current consumption (the amount of load connected to the battery 40). This allows for appropriate charging mode selection according to the present situation.

In a preferred embodiment of the present invention, the remaining battery level SOC and the level threshold value (e.g., 70%, 95% in the example of FIG. 4) are compared in the automatic charging mode operation. According to the comparison, one of the plurality of charging modes having different amounts of current generation (rates of power generation) by the generator 32 is then selected. This causes one of the charging modes with a higher power rate to be selected when the remaining battery level SOC is low, while one of the charging modes with a smaller power rate to be selected when the remaining battery level SOC is high. Accordingly, adequate charge control is enabled according to the remaining battery level SOC.

In a preferred embodiment of the present invention, the load on the battery 40 (current consumption) and the load threshold value (e.g., 15 A, 18 A, 20 A in the example of FIG. 4) are also compared in the automatic operation mode. According to the comparison, one of the plurality of charging modes having different amounts of current generation (rates of power generation) by the generator 32 is then selected. In a particular preferred embodiment, such charging mode selection is made when the remaining battery level SOC is 70% to 95% (see FIG. 4), for example. This causes one of the charging modes with a higher power rate to be selected when the load on the battery 40 is high, while one of the charging modes with a smaller power rate to be selected when the load on the battery 40 is low. Accordingly, adequate charge control is enabled according to the amount of load on the battery 40.

In a preferred embodiment of the present invention, when the remaining battery level SOC changes beyond the level threshold value (e.g., 70%, 95% in the example of FIG. 4) in the automatic charging mode operation, the charging mode is also changed (see FIG. 4). That is, as the remaining battery level SOC increases, a transition to one of the charging modes with a smaller amount of fuel consumption occurs accordingly. This reduces the fuel consumption.

In a preferred embodiment of the present invention, the user is able to operate the charging mode selector switch 47 to select one of the charging modes manually. In this case, the user is not required to adjust the engine speed directly but only to select one of the plurality of charging modes, and the target speed of the engine 12 is controlled adequately by the engine ECU 30 according to the selected charging mode. It is therefore easy to prevent, for example, the engine speed increasing excessively, such that adequate charge control is achieved even when the battery 40 is charged according to an operation by the user.

In a preferred embodiment of the present invention, the user is able to operate the control lever 46 to adjust the output power of the engine 12 and select one of the shift positions. In the neutral shift position, manual charging mode selection through an operation of the charging mode selector switch 47 is then allowed and the user is able to make a selection among the charging modes. That is, the neutral shift position (in the power shutoff state) is a condition used to select the manual charging mode. It is therefore possible to adjust the output power of the engine 12 and make a selection among the shift positions with preference over the charging mode selection, which allows charging mode selection without interfering with the adjustment and selection of the magnitude and direction of the propulsive force.

As described above, when the engine 12 includes a plurality of cylinders, the operation of at least one of the cylinders may be stopped in at least one of the plurality of charging modes (see FIG. 3). In the charging modes that use the cylinder stop operation, the fuel consumption is reduced during charging. Stopping a cylinder in some of the plurality of charging modes would cause the charging mode to be selected with preference for fuel efficiency. This allows for adequate charge control in terms of fuel efficiency.

In a preferred embodiment of the present invention, the remaining battery level is calculated based on SOC (State Of Charge). It is therefore possible to calculate the remaining battery level accurately compared to, for example, evaluation of the remaining battery level based on the battery voltage. This allows for manual or automatic charging mode selection according to the accurately calculated remaining level of the battery. This allows for adequate charge control.

In a preferred embodiment of the present invention, the plurality of charging modes include charging modes (e.g., idling levels Lv1 to Lv3 in FIGS. 2 and 3) in which idling speeds (target speeds) higher than that in the normal mode are able to be set. In such charging modes, the power rate by the generator 23 is higher than that in the normal mode, allowing for quick charging of the battery 40.

In a preferred embodiment of the present invention, when a change into a shift-in position occurs during operation in one of the charging modes to leave the power shutoff state, the normal mode is selected automatically (Steps S7, S8 in FIG. 5). Accordingly, the battery 40 is charged adequately without the charge control impacting the adjustment of the propulsive force of the vessel propulsion device 11.

In a preferred embodiment of the present invention, when a change into the neutral shift position occurs during operation in the normal mode and when the automatic charging mode selection is not set, the most recently set one of the plurality of charging modes is restored (Step S42). It is therefore not necessary for the user to perform an operation of selecting the charging mode again. This allows the battery 40 to be charged adequately according to the user's intention.

It is noted that even when the automatic charging mode selection is set, the most recent charging mode may be restored once. This allows for appropriate charging mode selection without waiting for the engine ECU 30 to perform a process or select a charging mode, and therefore adequate charge control is enabled from the beginning of a change into the neutral shift position.

In a preferred embodiment of the present invention, when a change from the neutral shift position into a shift-in position occurs (Step S7: NO), a lower target speed is set before the idling speed of the normal mode is set to perform shift shock mitigation control (Step S31). This allows the shift shock to be mitigated for smooth transition into the shift-in state. In some of the charging modes, since the idling speeds are set higher than that in the normal mode, direct shift-in can cause a large shift shock. Hence, the shift shock mitigation control allows for smooth transition from the charging mode into the normal mode.

In a preferred embodiment of the present invention, selection of at least one of the plurality of charging modes is disabled in the manual charging mode operation according to either one or both of the remaining battery level SOC and the load on the battery 40 (current consumption) (Step S43). This allows inadequate charging mode selection to be prevented and ensure adequate charge control is achieved.

In the automatic charging mode operation, a selection among the charging modes is made according to a map (see FIG. 4). Accordingly, some of the charging modes are to be disabled according to either one or both of the remaining battery level SOC and the load on the battery 40 (current consumption). In particular, when the remaining battery level SOC is lower than 70%, for example, the charging modes of the idling levels Lv−1 to Lv2 are disabled. Also, when the remaining battery level SOC is equal to or higher than 95%, for example, the charging modes of the idling levels Lv1 to Lv3 are disabled. Since the number of enabled charging mode selections is thus reduced, the amount of processing by the controller to select the appropriate charging mode is reduced.

While preferred embodiments of the present invention have been described above, the present invention may be embodied in other forms.

For example, in the above-described preferred embodiments, the shift position sensor 16 preferably detects the neutral shift position (power shutoff state). Instead, the neutral shift position (power shutoff state) may be detected using a detection signal from a position sensor that detects the operation position of the control lever 46. That is, the engine ECU 30 may detect the power shutoff state when the control lever 46 is in a position indicating the neutral shift position.

In the above-described preferred embodiments, a selection among the charging modes is preferably made according to a map in the automatic charging mode operation (see FIG. 4). Instead of using a map, computing a comparison between the remaining battery level SOC and the level threshold value and/or comparison between the current consumption and the threshold value (load threshold value) may be used to select among the charging modes.

Although in the above-described preferred embodiments, the most recent charging mode is preferably restored upon transition to the manual mode operation (Step S42), such a process may be skipped.

Although in the above-described preferred embodiments, either one of the automatic charging mode and the manual charging mode may be selected, only one of the charging modes may be included.

Also, the shift shock mitigation control, which is performed upon starting the normal mode operation, may be performed only when the idling speed is equal to or higher than a specified value, for example, in the case of the idling levels Lv1 to Lv3 in FIG. 2.

Further, the remaining battery level may be obtained based on a result of a detected battery voltage in a load connected state, instead of SOC computation based on a measurement of the open circuit voltage OCV.

Although in the above-described preferred embodiments, an outboard motor is described as an example of the vessel propulsion device 11, preferred embodiments of the present invention can also be applied similarly to vessel propulsion devices such as inboard motors, inboard-outboard motors, and jet pumps.

The present application claims priority to Japanese Patent Application No. 2016-153163 filed in the Japan Patent Office on Aug. 3, 2016, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel propulsion device that transmits a drive force of an engine to a propulsive force generator, the vessel propulsion device comprising:
   a generator that is driven by the engine;
   a power shutoff detector that detects a power shutoff state in which the drive force of the engine is not transmitted to the propulsive force generator; and
   a controller configured or programmed to, when the power shutoff detector detects the power shutoff state, allow selection of one of a plurality of charging modes to charge a battery connected to the generator and to control a target speed of the engine based on a selected one of the plurality of charging modes.

2. The vessel propulsion device according to claim 1, wherein the plurality of charging modes have different electricity generating efficiencies.

3. The vessel propulsion device according to claim 1, wherein the plurality of charging modes have different capacities of power generated by the generator.

4. The vessel propulsion device according to claim 1, wherein the controller is configured or programmed to select one of the plurality of charging modes based on a remaining level of the battery or an amount of load connected to the battery.

5. The vessel propulsion device according to claim 1, wherein
   the plurality of charging modes include a first charging mode in which the generator generates electricity at a first power rate and a second charging mode in which the generator generates electricity at a second power rate higher than the first power rate; and
   the controller is configured or programmed to select the second charging mode when the remaining level of the battery is lower than a first level threshold value.

6. The vessel propulsion device according to claim 1, wherein
   the plurality of charging modes include a third charging mode in which the generator generates electricity at a third power rate and a fourth charging mode in which the generator generates electricity at a fourth power rate higher than the third power rate; and
   the controller is configured or programmed to select the fourth charging mode when an amount of load connected to the battery is equal to or higher than a load threshold value.

7. The vessel propulsion device according to claim 1, wherein
   the plurality of charging modes include a fifth charging mode and a sixth charging mode; and
   the controller is configured or programmed to, when the remaining level of the battery becomes equal to or higher than a second level threshold value during operation in the fifth charging mode, cause a transition to the sixth charging mode having a target speed lower than a target speed in the fifth charging mode.

8. The vessel propulsion device according to claim 1, further comprising a mode selector operated by a user to select one of the plurality of charging modes; wherein
   the controller is configured or programmed to control the target speed according to a charging mode selected by the mode selector.

9. The vessel propulsion device according to claim 8, further comprising a propulsion operator, separate from the mode selector, operated by the user to adjust either one or both of an output power of the engine and a propulsive force of the vessel propulsion device; wherein
   the controller is configured or programmed to, when the power shutoff detector detects the power shutoff state, allow selection of one of the plurality of charging modes by the mode selector.

10. The vessel propulsion device according to claim 1, wherein the controller is configured or programmed to, in the power shutoff state, change an amount of air intake by the engine to achieve the target speed corresponding to the selected charging mode.

11. The vessel propulsion device according to claim 1, wherein
   the engine includes a plurality of cylinders; and
   the controller is configured or programmed to, in at least one of the plurality of charging modes, stop an operation of at least one of the plurality of cylinders.

12. The vessel propulsion device according to claim 1, wherein the controller includes a normal mode including a first idling speed as the target speed, and the controller is configured or programmed to, in at least one of the plurality of charging modes, set a second idling speed that is higher than the first idling speed as the target speed.

13. The vessel propulsion device according to claim 12, wherein the controller is configured or programmed to, when the power shutoff detector no longer detects the power shutoff state during operation in one of the plurality of charging modes, select the normal mode.

14. The vessel propulsion device according to claim 12, wherein the controller is configured or programmed to, when the power shutoff detector detects the power shutoff state during operation in the normal mode, return to a most recently set one of the plurality of charging modes.

15. The vessel propulsion device according to claim 12, wherein the controller is configured or programmed to, when the power shutoff detector no longer detects the power shutoff state, temporarily set a target speed lower than the first idling speed.

16. The vessel propulsion device according to claim 1, wherein the controller is configured or programmed to disable at least one of the plurality of charging modes according to either one or both of a remaining level of the battery and an amount of load connected to the battery.

* * * * *